Sept. 17, 1968 A. R. CRIPE 3,401,644
MOTOR ACTUATED RAILWAY HOPPER CAR DOOR MECHANISM
Filed Jan. 17, 1966 5 Sheets-Sheet 1

INVENTOR.
Alan R. Cripe
BY
Wood, Herron & Evans
ATTORNEYS

Sept. 17, 1968     A. R. CRIPE     3,401,644
MOTOR ACTUATED RAILWAY HOPPER CAR DOOR MECHANISM
Filed Jan. 17, 1966     5 Sheets-Sheet 2

INVENTOR.
Alan R. Cripe
BY
Wood, Herron & Evans
ATTORNEYS

Sept. 17, 1968            A. R. CRIPE            3,401,644

MOTOR ACTUATED RAILWAY HOPPER CAR DOOR MECHANISM

Filed Jan. 17, 1966            5 Sheets-Sheet 4

INVENTOR.
Alan R. Cripe
BY
Wood, Herron & Evans
ATTORNEYS

Sept. 17, 1968 A. R. CRIPE 3,401,644
MOTOR ACTUATED RAILWAY HOPPER CAR DOOR MECHANISM
Filed Jan. 17, 1966 5 Sheets-Sheet 5

INVENTOR.
Alan R. Cripe
BY
Wood, Herron & Evans
ATTORNEYS

United States Patent Office 3,401,644
Patented Sept. 17, 1968

3,401,644
MOTOR ACTUATED RAILWAY HOPPER
CAR DOOR MECHANISM
Alan R. Cripe, Richmond, Va., assignor to Aeronca
Manufacturing Corporation, Middletown, Ohio, a
corporation of Ohio
Filed Jan. 17, 1966, Ser. No. 521,088
9 Claims. (Cl. 105—240)

ABSTRACT OF THE DISCLOSURE

This invention relates to railway transport vehicles and more particularly to a hopper car-unit intended for transporting coal, grain, dry chemicals, and other dry bulk commodities. The present invention is directed more particularly to the hopper doors which form the bottom of the car-unit, and to the pneumatic motor mechanism for operating the rotatable torsion shafts which mount the door latches. The hopper doors are pivotally mounted concentrically on the torsion shafts with further pneumatic motor mechanism for operating the hopper doors.

---

The invention essentially comprises a hopper car unit having a series of pivotally mounted hopper doors extending transversely across the open bottom of the car for supporting the lading. The car includes a longitudinal center sill, the arrangement being such that the transverse hopper doors are divided into two sections located on opposite sides of the center sill. The hopper doors collectively form, in closed position, a flat bottom for supporting the lading and, upon release, swing downwardly by gravity to their open position for rapid unloading.

The transversely extending doors are each pivotally mounted upon respective torsion elements in the form of tubes journalled in bearings secured to the side walls and to the center sill, the pivoted doors each having a free edge portion underlying the pivoted end portion of the adjacent door. The doors are latched in closed position by latching hooks fixed to the torsion tubes and engaging pins projecting outwardly from opposite ends of the doors. Each torsion tube has the double function of pivoting its door for swinging motion about the torsion tube and also of operating the latching hooks which lock the free edge of the door in its closed position, the latching hooks being released by rocking the torsion tubes relative to their doors in a release direction. For this purpose, each torsion tube includes an actuating lever, the levers connected in common by links leading to an air bellows and arranged to swing the actuating levers to unlatching position upon being expanded. This action rocks the torsion tubes and swings the latching hooks to release position, such that the doors are allowed to swing by gravity to their open position concurrently. When the air pressure is exhausted, the bellows are collapsed by operating of tension springs, thus rocking the torsion tubes and latching hooks back to the latching position.

For closing the doors after unloading, there is provided a closing mechanism connected in common to all the door sections. The door closing mechanism also includes an air bellows which, when expanded, swings the released doors to their fully opened perpendicular position counter to the springs.

When the doors are to be opened, air pressure is first applied to the bellows of the latching mechanism to unlatch the hooks, allowing the weight load to force the doors to their open position counter to the bias effect of the tension springs. The bellows of the door closing mechanism is then expanded to hold the doors in their fully open position counter to the springs after unloading. When the doors are to be closed, the air pressure is exhausted to collapse the air bellows of the door closing mechanism, allowing the springs to close the doors, then the air bellows of the door latching mechanism is collapsed to latch the doors in closed position. By virtue of the tension springs, the doors may be closed and latched automatically in the event of failure of air pressure to the air bellows.

Generally speaking, the car-unit for which the hopper door mechanism of this invention is intended, forms one unit or module of a car assembly consisting of a series of car-units or modules pin-jointed to one another, with standard railway couplings at opposite ends. Accordingly, a series of car assemblies comprising, for example, four modules each, may be coupled together to form a train of cars, which is pulled by a locomotive for transport in the usual way. The car-units of the invention are fabricated from light weight metal, such as aluminum. Essentially, the light weight car-unit is designed to provide a greater payload to car weight ratio, thereby to provide a substantial overall saving in the cost of transporting the dry commodities mentioned above.

One of the primary objectives of the present invention has been to provide a hopper door arrangement in which the hopper doors collectively, in closed position, constitute a flat bottom, and in which the entire bottom of the car-unit is opened when the doors are shifted to their unloading position, thereby to provide exceptionally rapid unloading of the car-unit.

According to this aspect of the invention, the chassis of the car-unit comprises a rigid center sill having two transverse end transoms which are in direct engagement with the wheel suspension springs, such that direct load paths are established from the springs to the car-unit. The hopper doors are in the form of door sections extending transversely from opposite sides of the center sill to the side walls of the car, with the marginal side edges of each door section establishing a sealing engagement with the center sill and side wall. The forward and rearward edges of the hopper doors establish a sealing engagement with one another, transversely from the center sill to the side walls to prevent any seepage of the car contents. When the door sections swing downwardly from their closed horizontal position to their perpendicular unloading position, substantially the entire bottom of the car is open for rapid unloading. By way of example, each car-unit or module can be dumped in about fifteen seconds, such that a train made up of a series of car assemblies consisting of multiples of pin-jointed modules may be discharged into receiving pits while the train is in motion.

A further objective of the invention has been to provide an approved hopper door construction, wherein each hopper door comprises two independent sections extending outwardly from opposite sides of the center sill and in the form of light weight extrusions which are collectively of far more rigid construction than conventional hopper doors, so as to resist deflections and failures.

In order to impart rigidity and strength to the doors while providing light weight construction, each door section of a complete door, which extends outwardly in opposite directions from the center sill, is in the form of a hollow extrusion, formed of aluminum or a similar light weight material. Each door section comprises spaced upper and lower walls and includes a cylindrical boss along one edge pivotally mounted upon a torsion bar or rock shaft, while the free edge of the door section is configurated to nest from below with the cylindrical boss of the adjacent door section. By reason of the relatively small size of each door section, the collective door structure is exceptionally strong and rigid.

A further objective of the invention has been to provide an improved mechanism for controlling the operation of the hopper door sections.

According to this aspect of the invention, each independent door section is held positively in its closed position by a latching mechanism including latching hooks which engage latch pins projecting outwardly from the opposite ends of each door section. The latching mechanism is shifted in the unlatching direction by a power unit preferably comprising air-operated bellows or hydraulic cylinders. The latching hooks collectively are spring biased in latching direction for safety, such that the doors are unlatched only when air pressure is supplied to the unlatching bellows. Thus, when the car-unit is to be unloaded, air pressure is supplied to the unlatching bellows to shift the latching hooks to their unlatching position, counter to the biasing effect of the latching springs. The weight load of the lading thereupon forces the doors downwardly to their unloading position, causing the car-unit to unload its contents.

A door operating mechanism coacts with the latching mechanism to aid in opening and closing the hopper door sections. The door operating mechanism essentially comprises a power unit, preferably an air-operated door closing bellows connected to the collective hopper door sections and arranged to swing the doors fully to their perpendicular unloading position. The door operating mechanism includes tension springs normally biasing the door sections in closing direction, similar to the biasing springs which normally bias the latching mechanism in its latching direction, such that doors swing automatically, to their closed position when air is exhausted from the bellows.

The air bellows for the latching mechanism and the air bellows for the door operating mechanism are supplied with air pressure in sequence, such that the latching mechanism first disengages the doors, then the door operating mechanism shifts the doors to their fully opened position.

After the unloading operation, the bellows are activated in reverse order, such that air pressure is first exhausted from the latching bellows, causing the latching hooks to swing back to their latching position. Thereafter, the air pressure is exhausted from the door operating bellows, adapting the tension springs to swing the door sections upwardly to their closed horizontal position. A particular advantage of the biasing springs arises from the fact that, in the event of failure of the train air pressure system, the tension springs will automatically shift the latching hooks to their latching position and the tension springs of the door operating mechanism will automatically swing the doors back to their closed and latched position.

The various features and advantages of the present invention will be more fully apparent to those skilled in the art from the following detailed description taken in conjunction with the drawings.

*General arrangement*

Figure 1:
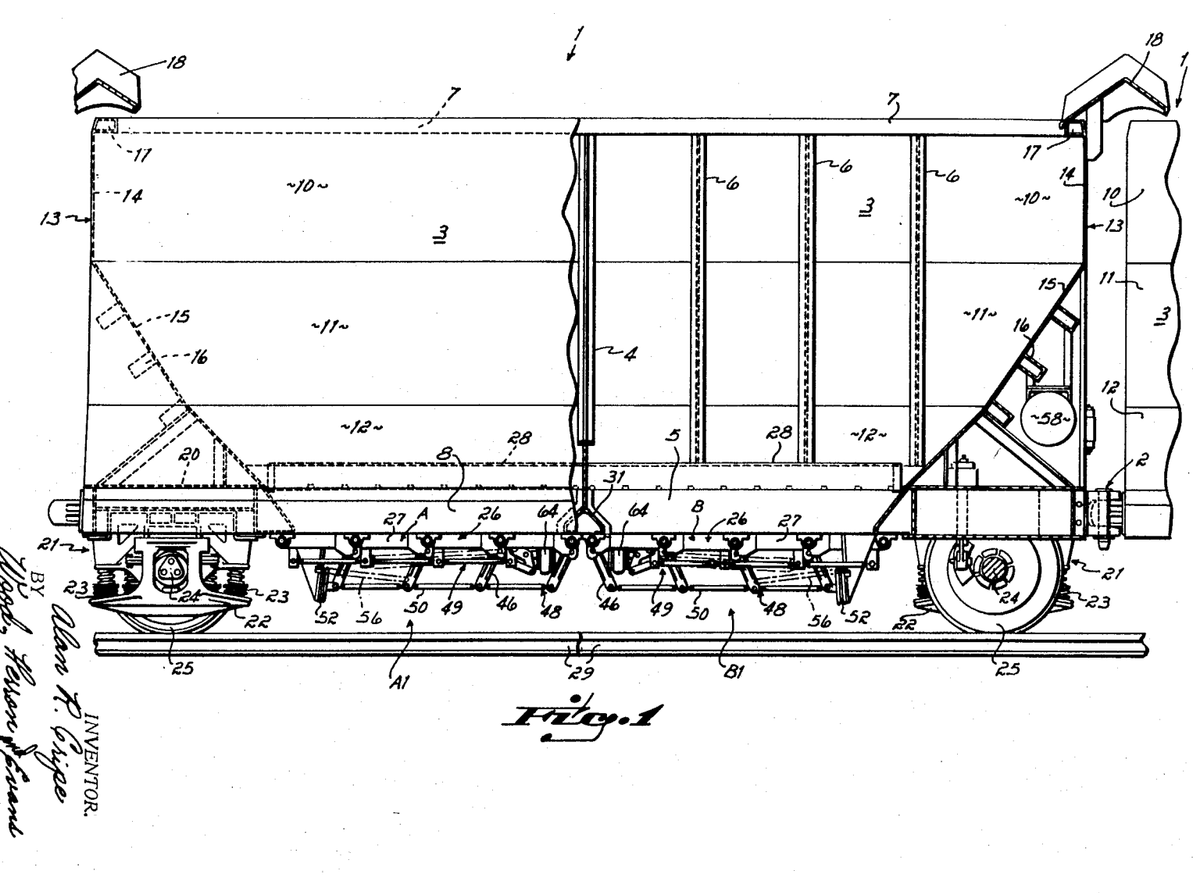
FIGURE 1 is a side elevation, partly broken away, showing the general arrangement of one of the modules or car-units embodying the hopper doors and actuating mechanism of the present invention.
Figure 2:
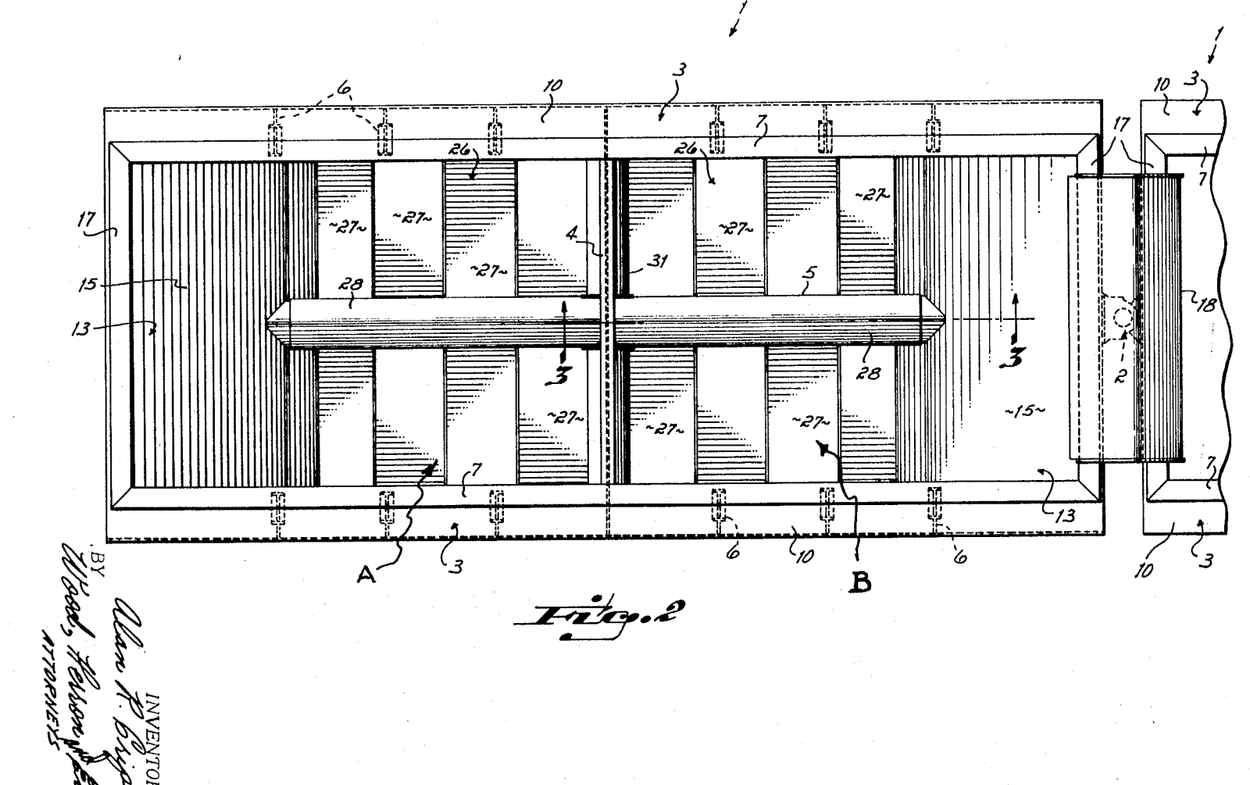
FIGURE 2 is a top plan view of the car-unit shown in FIGURE 1.

A car-unit or module, which embodies the hopper door mechanism of the present invention is shown generally in FIGURES 1 and 2. As noted earlier, each car-unit or module, indicated generally at 1, makes up one complete car assembly, preferably consisting of four car-units which are articulated in end-to-end relationship. The adjacent car-units or modules are pin-jointed to one another, as indicated generally at 2, a portion of an adjacent car-unit being shown at 1 in FIGURES 1 and 2.

Each car-unit or module 1 is approximately one-half the length of a conventional hopper or gondola car. In the present example, the first and fourth car-units of the group are provided with conventional railroad couplings to permit any desired number of articulated car assemblies (groups of four modules) to be coupled to one another to provide a train of the required length.

Generally speaking each car-unit 1 comprises a pair of side walls (FIGURES 1 and 2), indicated generally at 3—3, formed of aluminum or other light weight material and having a rigid center frame 4 located at a mid-point along the length of the car-unit and secured to the side walls 3—3. The lower edge of the center frame 4 is rigidly secured to a center sill 5 of box-like cross section, which extends longitudinally for the length of the car-unit 1 and which is arranged to impart longitudinal stiffness to the car-unit, in addition to the stiffening effect provided by the side walls 3.

Figure 5:
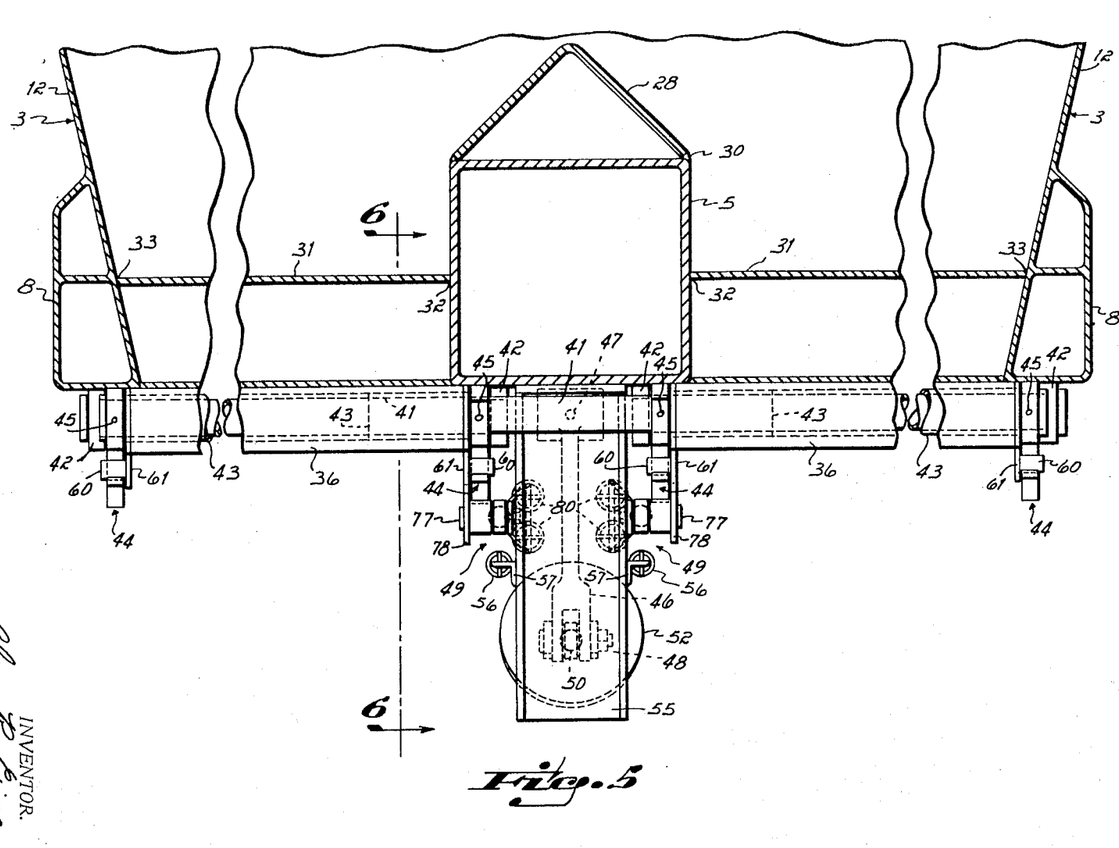
FIGURE 5 is a fragmentary cross sectional view, taken along line 5—5 of FIGURE 3, further detailing the construction of the car-unit and the hopper door mechanism.

The side walls 3 are stiffened by a series of vertical internal ribs 6 and the upper longitudinal edge of each side wall 3 is reinforced by a box-like section 7, preferably in the form of an extrusion. The lower edge of each side wall is also reinforced by a box-like extrusion 8, as best shown in FIGURES 1 and 5. In the present example, each side wall is made up of a set of three longitudinal panels, indicated at 10, 11 and 12 in FIGURE 1, the upper extrusion 7 and the lower extrusion 8 preferably being formed as an integral part of the upper panel 10 and lower panel 12.

The car-unit 1 (FIGURES 1 and 2) includes end walls indicated generally at 13—13, the upper portion of each end wall being vertical as at 14 and having downwardly and inwardly sloping portions 15 leading to the bottom of the car-unit. The sloping portion 15 of each end wall is provided with transverse reinforcing members 16, of U-shaped cross section, which may also be in the form of extrusions secured to wall portion 15.

The upper edge of the vertical portion 14 of the end wall is provided with a box-like extrusion 17, similar to the extrusion 7 of the side walls and having its opposite ends joined to the longitudinal extrusion 7 for reinforcement. In order to permit flood-loading of the materials from an overhead source of supply while the car assembly is in motion, each car-unit 1, at its right hand end, as viewed in FIGURES 1 and 2, is provided with a hood or deflector 18 secured to the transverse extrusion 17 and bridging the adjacent ends of the car-units 1.

As viewed in FIGURE 1, the opposite ends of the longitudinal center sill 5 are joined to respective transoms 20—20 which are also of box-like cross section extending transversely between the side walls 3—3. The longitudinal center sill 5 and the transverse transoms 20 thus form the frame or chassis of each car-unit 1.

The car-unit is carried upon respective single axle suspension systems (FIGURE 1), indicated generally at 21 (FIGURE 1), comprising a wing type axle-box 22, each axle-box having a set of coil springs 23. The transoms 20 thus transmit the weight load of the car by way of the coil springs 23 to the axle-box 22 which carries the axle 24. The wheels 25, which are generally conventional flanged railroad wheels, are tracked upon the rails 29. It will be understood at this point, that the actuating mechanism of the hopper doors is secured directly to the lower surface of the longitudinal box-like center sill 5 in a position protected by the sill when the hopper doors are opened to unload the car.

Hopper doors

As best shown in FIGURE 2, the entire bottom of the car unit is made up of the collective hopper doors 26 of the present invention. Each hopper door 26 comprises two independent sections 27—27 extending outwardly on opposite sides of the center sill 5 to the side walls 3—3. Each pair of door sections 27 operates as units, the sections on opposite sides of the sill being mounted upon a common hinge arrangement, as explained later. The door arrangement is such that virtually the entire bottom of the car opens to provide rapid unloading when the doors swing downwardly from the closed horizontal position to their downwardly suspended vertical position.

It will be understood that the sloping portions 15 (FIGURE 1) of each end wall causes the contents of the car (coal or a similar commodity) to slide downwardly to the open bottom during the unloading operation. In order to prevent any of the material from collecting upon the center sill 5, the upper edge of the sill is provided with a deflector or shield 28 (FIGURE 5) which is generally of inverted V-shape in cross section, having its lower edges preferably welded as at 30 to the box-like section of the center sill 5. In addition, the lower edge of the center frame 4 (FIGURES 1 and 2), is also of inverted V-shape, as indicated at 31, to aid in the discharge of material. It will be understood, at this point that the V-shaped lower edge 31 of the center frame 4 has its inner ends secured as at 32 to the center sill 5 and its outer ends secured as at 33 to the lower reinforcing extrusions 8 of the side walls (FIGURE 5).

The hopper door actuating mechanism which opens and closes the doors, is mounted directly under the center sill 5 (FIGURE 5), as noted earlier. By virtue of this arrangement, the center sill has the double function of imparting longitudinal rigidity to the car-unit and also of protecting the door actuating mechanism from the contents of the car when the hopper doors are opened.

Each independent door section 27 is extremely stiff and rigid due to the hollow, extruded cross section of the door, as described later in detail. In the present example, each door section 27 is approximately four feet in length as measured transversely from the center sill to the side wall, and is approximately two feet in width, that is in the direction longitudinally along the car-unit. By virtue of their relatively small size and rigid structure, the door units collectively are considerably stronger than conventional hopper doors and strongly resist deflections and failures which are inherent in larger doors; moreover, the power required in operating the small doors is greatly reduced.

As best shown in FIGURES 1 and 2, the collective hopper doors 26 are arranged in two groups located on opposite sides of the rigid center frame 4—4, the groups being indicated at A and B. Each group of doors is served by its own mechanism the two mechanisms being indiciated respectively at A1 and B1 corresponding with the group of doors served. Each individual hopper door section 27 has a perimeter which provides a sealing engagement with the extrusions 8 of the side walls 3—3 and center sill 5 longitudinally, and with one another transversely of the car-unit.

Figure 6:
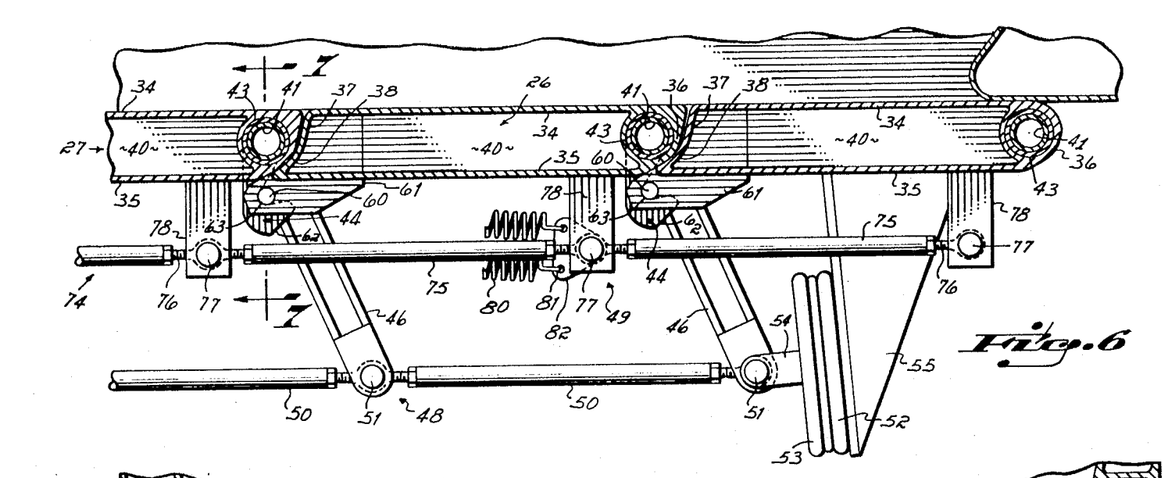
FIGURE 6 is a fragmentary longitudinal sectional view taken along line 6—6 of FIGURE 5, further illustrating the hopper door structure and actuating mechanism.
Figure 7:
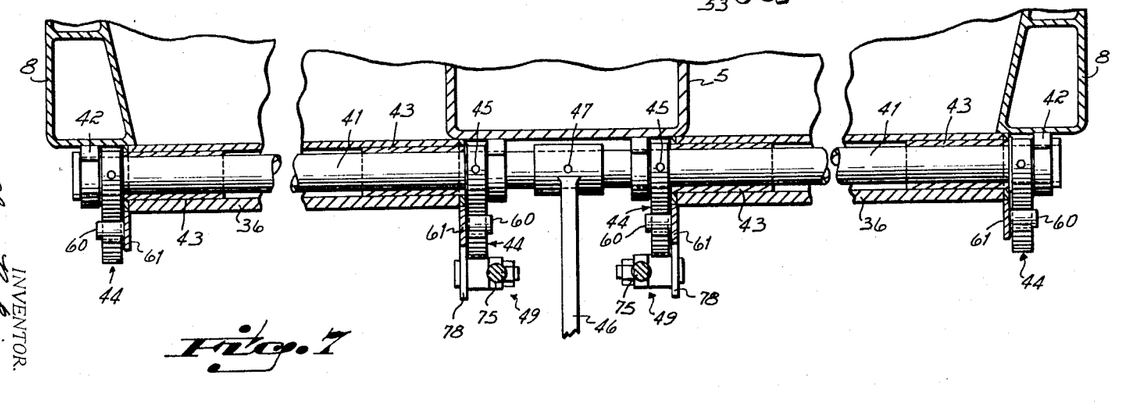
FIGURE 7 is a transverse fragmentary sectional view taken along line 7—7 of FIGURE 6, further illustrating the hopper door structure and its actuating mechanism.

As best shown in FIGURES 6 and 7, each hopper door section 27 is in the form of a hollow extrusion providing spaced upper and lower walls 34 and 35 joined to a reinforced cylindrical boss 36 at its hinged edge, and having an end wall 37 at its swinging edge. The end wall 37 slants forwardly and its lower portion includes a curved projection 38 which seats against the curved boss 36 of the adjacent door. The opposite edges of each door section 27 include opposed side walls 40—40 (FIGURES 6 and 7) which are applied and secured in place, preferably by welding after the extruded door section 27 is formed. The side walls 40 reinforce the door section 27 and prevent dirt and dust from accumulating within the hollow door section.

The respective door sections 27 of each door 26 are hinged in common upon a torsion tube 41 (FIGURES 5, 6 and 7). Each torsion tube 41 is journaled in a set of bearings 42 arranged in pairs, the outer pair of bearings 42 being secured to the under surface of the box-like extrusions 8 along the lower edges of the side walls 3, the inner pair of bearings 42 being secured to the under surface of the center sill 5.

The door sections 27 are journaled for swinging motion with reference to the torsion tube 41. For this purpose, each door section 27 includes a pair of internal bushings 43—43 seated within the boss 36 and rotatably journaled upon the torsion tube 41. It will be understood at this point, that the torsion tube has the double function of pivoting the door sections 27 for swinging motion and also of operating the latches which normally lock the swinging edge of the doors in their closed horizontal position. In other words, the torsion tube acts as a rock shaft in releasing and engaging the latches, while the door sections are free to swing about the axis of the torsion tube upon being opened or closed.

The door actuating mechanism comprises two separate mechanisms, one comprising the door latching mechanism, hereinafter indicated at 48, and the door closing mechanism indicated generally at 49 (FIGURE 1). In order to clarify the description, the latching mechanism 48 and the door closing mechanism 49 are described in separate sections below.

Door latching mechanism

As noted above, the door sections 27 are held securely in closed position (FIGURES 1, 6 and 7) by the latching mechanism 48, which is associated with the torsion tubes 41. Thus, as shown in FIGURES 5, 6 and 7 each torsion tube 41 is provided with two pairs of latching hooks as indicated generally at 44. The respective pairs of hooks serve the individual door sections 27 on opposite sides of the center sill 5. Each latching hook is pinned as at 45 to its torsion tube 41 adjacent the bearing 42 in which the tube is journaled.

The hooks are shifted from the latching to the unlatching position by means of levers 46, one lever for each torsion tube 41 (FIGURES 5 and 7). The levers 46 are pinned as at 47 to the torsion tube (FIGURE 7) to impart rocking motion to the torsion tube 41 in swinging the hooks to their latching and unlatching position.

Figure 3:
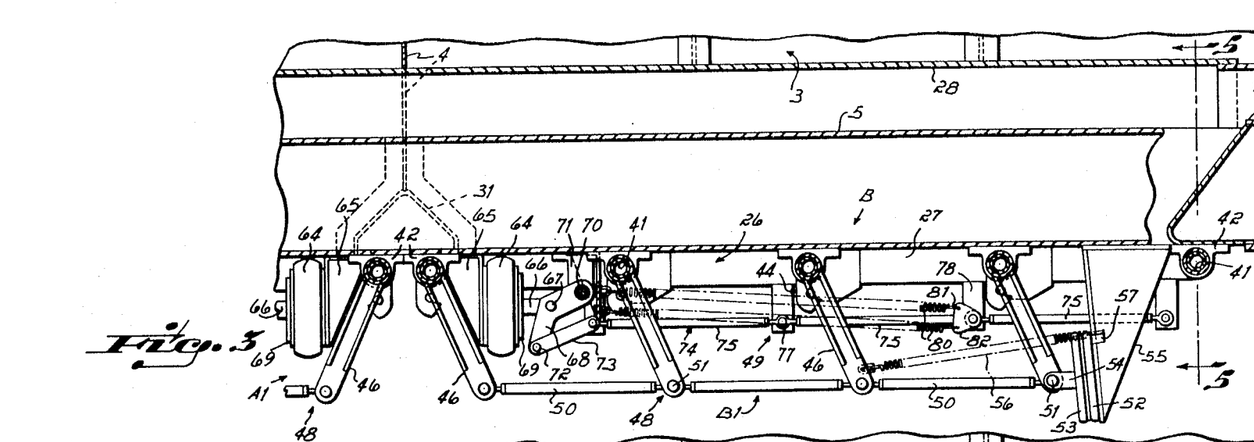
FIGURE 3 is an enlarged fragmentary sectional view taken along line 3—3 of FIGURE 2, illustrating the internal construction of a portion of the car-unit, with the hopper doors and actuating mechanism shown in the closed position.

As noted earlier, the two groups of hopper doors A or B are latched and released by the sets of mechanisms A1 and B1, comprising the latching mechanism 48 and a closing mechanism 49. The mechanisms A1 and B1 are duplicates of one another, although the two mechanisms face in opposite direction (FIGURE 1). Thus, the group of doors A swing downwardly in an arc from the left, while the group of doors B swing downwardly from the right. The latch operating levers 46 of group A1 swing toward the right in releasing the group of doors A (FIGURES 3 and 4), while the latch actuating levers 46 of group B1 swing toward the left in unlatching the group of doors B. The following description of the latch actuating mechanism applies to both groups, since they are identical to one another.

Described generally (FIGURES 3–7), each latch mechanism 48 comprises a system of parallel links 50, each link 50 being pivotally connected in common as at 51 to the lower ends of the latch actuating levers 46. The group of parallel links is shifted longitudinally by means of an air bellows 52 which includes a rigid end plate 53 having a clevis 54 pivoted as at 51 to the link 50 at the right end.

The air bellows 52 is conventional and is not disclosed in detail. The bellows 52 is mounted on a bracket 55 which depends downwardly from the center sill 5, the bracket being of channel shape in cross section for stiffness. The latching mechanism 48 and bellows 52 are shown in the latching position in FIGURE 3 with the bellows collapsed and are shown in the unlatching position in FIGURE 4, with the air bellows 52 expanded.

The latching mechanism 48 is normally biased to the latching direction by a pair of coil springs 56—56 (FIGURES 3–5), the tension springs each having one end anchored as at 57 to the bracket 55 and their opposite ends anchored as at 58 to one of the latching levers 46. Thus, when the air bellows 52 is expanded (FIGURE 4), the levers 46 are thrust in the unlatching direction, as indicated by the arrows C, counter to the tension of the springs 56. When the air pressure is exhausted from the bellows 52, the tension springs 56 cause the levers 46 to swing in the latching direction and to collapse the air bellows.

Air pressure is supplied to the bellows 52 by way of an air reservoir 58 (FIGURE 1) which forms a part of the air supply system of the train. The flow of air pressure from the air reservoir to the air bellows is supplied by a conduit (not shown) having a valve for admitting and exhausting the air pressure with respect to the air bellows. It will be understood that both air bellows 52 of the car-unit are supplied with air pressure concurrently and are exhausted concurrently so as to unlatch both groups of doors A and B at the same time for unloading.

Each latching hook 44 (FIGURES 3–7) engages a latch pin 60 projecting outwardly from a mounting plate 61. The latching plates 61 and their latch pins 60 are secured to the opposite side edges of each door section 27 in positions to be engaged by the latching hooks 44.

Figure 4:
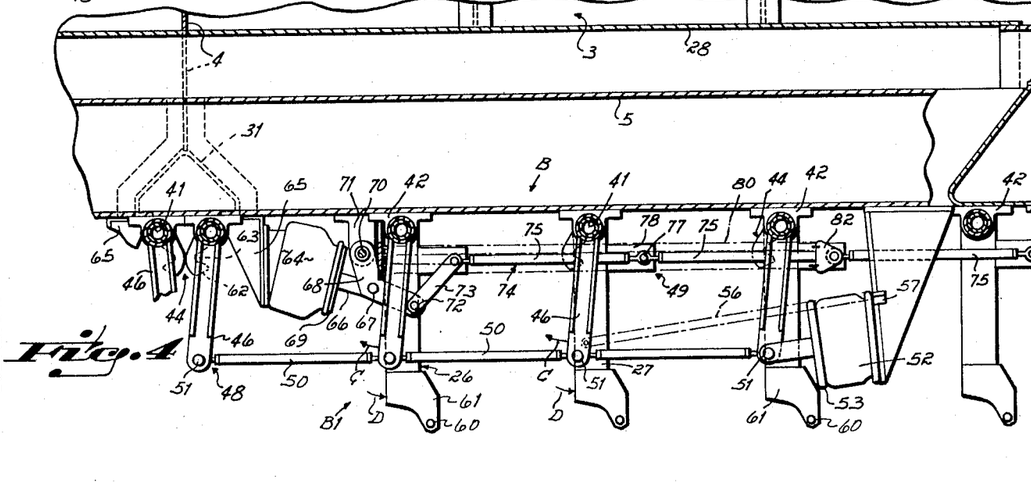
FIGURE 4 is a view similar to FIGURE 3, showing the actuating mechanism and hopper doors in open position.

In disengaging the latching pins 60, each hook 44 swings to the release position shown in FIGURE 4, as previously indicated by the arrows C in this view, with the air bellows 52 expanded. After the contents have been unloaded from the car-unit, air pressure is exhausted from the bellows 52, such that the hooks 44 swing back to the latching position shown in FIGURE 6. The door sections 27 are then swung back to their closed position, by operation of the door closing mechanism, previously indicated at 49. As the door sections approach their closed horizontal position, the respective pairs of latch pins 60 engage the inclined cam surface 62 (FIGURE 6) which is formed along the end portion of the hooks, thus camming the hooks 44 momentarily to the latching position until the pin 60 reaches the recess 63 of the hook (FIGURE 6). At this point, the hooks snap to their latching position by operation of the coil springs 56 to securely latch the door sections in closed position.

*Door closing mechanism*

The door closing mechanism 49 of the groups A1 and B1 is also mounted beneath the center sill 5 (FIGURES 3–7). The door closing mechanism of each section A1 and B1 is actuated by respective air bellows 64. Each bellows is mounted upon a cantilever bracket 65 which is attached to the center sill 5. In the closed position of the door sections 27 (FIGURE 3) contracted, the bellows is expanded to open the doors, as shown in FIGURE 4. It will be understood at this point, that the weight load of the lading resting upon the door sections 27 is sufficient to open the doors by gravity, as soon as the latching hooks 44 are shifted to their unlatching position. The bellows 64 serve primarily to swing the doors to their fully opened perpendicular position (FIGURE 4). The doors are closed by operation of tension springs, as described below, when the air pressure is exhausted from the air bellows 64.

Described in detail, each air bellows 64 includes a rigid end plate 69 (FIGURES 3 and 4) having a clevis 66 pivotally connected as at 67 to a bell crank lever 68. The bell crank lever is pinned to a rock shaft 70 which is journaled in bracket 71, also attached to the bottom surface of the center sill 5. The swinging end of the bell crank lever 68 is pivotally connected as at 72 to a line 73 which is connected to a system of parallel links 74.

As best shown in FIGURE 7, the parallel links 74 are in duplicate, straddling the latching mechanism 48, such that two sets of parallel links 74 are connected to the respective sets of door sections 27 on opposite sides of the center sill 5. It will be understood at this point, that there is provided two bell crank levers 68 and that the two levers 68 are pinned in common to the rock shaft 70, with one of the bell crank levers pinned as at 67 to the clevis 66 of the air bellows. The bellows 64 thus shifts both bell crank levers, and their associated parallel linkage systems 74 in unison.

Each link 75 of linkage system 74 includes, at its opposite ends, an adjustable clevis 76 (FIGURE 6). Each clevis 76 is pivotally connected as at 77 to a rigid arm 78 projecting downwardly from the respective door sections 27 alongside the latching hooks 44. The door sections 27 are normally biased in the closing direction by two pairs of tension springs 80 (FIGURES 5 and 6) which are anchored as at 81 to respective anchor plates 82. The anchor plates are pivotally connected to one arm 78 of the door sections 27—27. The respective pairs of tension springs 80, thus bias the collective door sections 27 of each group in door closing direction through operation of the linkage system 74.

It will be understood that the linkage system 74 is identical for the mechanisms A1 and B1, there being provided two air bellows 64—64 (FIGURE 1) and identical components for the two groups of doors A and B.

When the doors are to be opened, air pressure is first applied to the bellows 52—52 of the latching mechanism so as to unlatch the doors, as explained above. Thereafter the weight load of the lading will force the door sections 27 to the open position counter to the bias effect of the tension springs 80. Air pressure is then applied to the respective bellows 64—64 to swing the door sections fully to the open position as indicated by the arrows D in FIGURE 4.

When the doors are to be closed, the air pressure is exhausted from the bellows 64, permitting the springs 80 to close the door sections 27. Air pressure is admitted and exhausted with respect to the bellows 64 by way of a control valve inserted in a conduit (not shown) leading from the air reservoir 58. The valves for the door latching mechanism 48 and door closing mechanism 49, are operated in sequence, air pressure first being admitted to the latching bellows 52 to unlatch the doors, then to the bellows 64 to swing them to their fully opened position. The reverse order preferably is followed in closing the doors, such that air pressure is first exhausted from the latching bellows 52 to set the latching hooks 44 in latching position, then the pressure is exhausted from the door closing bellows 64 to permit the tension springs 80 to close the doors.

The tension springs 80, which swing the door sections to their closed position, exert a pull which is at least twice the force necessary to swing the door sections to their closed position. The closing force is also sufficient to overcome the resistance offered by the latching hooks 44 when the air pressure is exhausted from the bellows 52 of the latching mechanism. Accordingly, in the event that the air pressure of the train fails, the hopper door sections will swing automatically, by operation of the tension springs, to their closed and latched position.

Having described my invention, I claim:

1. A hopper door mechanism for a vehicle adapted to transport bulk lading, said vehicle having pairs of side and end walls, said hopper door mechanism comprising:

a plurality of hopper doors adapted collectively to form the bottom of said vehicle;

a latching mechanism connected to said doors collectively;

said latching mechanism having a plurality of normally stationary torsion elements rotatably mounted relative to said vehicle and extending transversely thereof, one for each of said doors;

said doors each having one edge pivotally connected to one of said torsion elements for swinging motion about the stationary torsion element, the opposite edge being free;

said doors adapted to swing downwardly about the stationary torsion elements to a generally perpendicular position with the free edges thereof disposed downwardly;

a plurality of latching elements secured to said torsion elements, said latching elements normally engaging said doors and holding the same in a generally horizontal closed position, whereby said doors collectively form the bottom of said vehicle;

means for shifting said latching mechanism to an unlatching position, whereby said torsion elements and latching elements are rotated relative to the pivoted edge of the doors and adapted to disengage said latching elements with respect to the said doors, adapting the doors to swing downwardly to said generally perpendicular unloading position;

each of said torsion elements thereby constituting a coaxial door pivot shaft and latch pivot shaft independently rotatable relative to the edge portion of the door section which is pivoted thereon; and a door operating mechanism connected to said collective hopper doors, said door operating mechanism adapted to shift said doors collectively from said generally perpendicular unloading position back to said generally horizontal latched closed position.

2. A hopper door mechanism as set forth in claim 1 in which the latching mechanism comprises a series of latch actuating levers, each latch actuating lever being non-rotatably secured to a respective torsion element for imparting rocking motion thereto, and a series of parallel links pivotally connecting the outer portions of said levers to one another for rocking motion in unison.

3. A hopper door mechanism as set forth in claim 1 in which each door section is in the form of a hollow extrusion having an upper and lower wall and having a boss portion along one edge rotatably journaled upon said torsion element, the free edge of each door section being configured to engage the boss portion of the adjacent door, thereby to provide a seal between the adjacent doors.

4. A hopper door mechanism for a vehicle adapted to transport bulk lading, said vehicle having a rigid center sill extending longitudinally of the vehicle, said vehicle having pairs of side walls and end walls, said hopper door mechanism comprising:

a plurality of hopper door sections extending transversely from opposite sides of said center sill toward said side walls, said door sections normally being disposed in a generally horizontal closed position and forming the bottom of the vehicle;

a plurality of normally stationary torsion elements extending transversely across said side walls and center sill and rotatably mounted relative to the vehicle;

each of said door sections having an edge portion pivotally mounted upon said torsion element on opposite sides of said center sill for swinging motion about the stationary torsion element, the opposite edge of each door section being free;

each of said door sections adapted to swing downwardly to a generally perpendicular unloading position about said stationary torsion element to which it is pivotally connected;

a latching mechanism mounted upon said vehicle and adapted to engage and latch said door sections collectively in said closed horizontal position and to release said door sections whereby the sections swing downwardly relative to the stationary torsion elements from said horizontal closed position to the perpendicular unloading position to discharge the lading from the vehicle;

each of said torsion elements thereby constituting a coaxial door pivot shaft and latch pivot shaft independently rotatable relative to the edge portion of the door which is pivoted thereon;

and door operating mechanism mounted on said vehicle and connected to said door sections collectively, said door operating mechanism adapted to shift said door sections from said perpendicular unloading position back to said horizontal closed position in engagement with said latching mechanism.

5. A hopper door mechanism for a vehicle adapted to transport bulk lading, said vehicle having a rigid center sill extending longitudinally of the vehicle, said vehicle having pairs of side walls and end walls, said hopper door mechanism comprising:

a plurality of hopper door sections extending transversely from opposite sides of said center sill toward said side walls, said door sections normally being disposed in a generally horizontal closed position and forming the bottom of the vehicle;

a plurality of normally stationary torsion elements extending transversely across said side walls and center sill;

each of said door sections having an edge portion pivotally mounted upon said torsion element on opposite sides of said center sill, said door sections adapted to swing downwardly to a generally perpendicular unloading position about said stationary torsion element;

a plurality of latching elements secured to said torsion elements, said latching elements normally engaging the doors and holding the doors in a generally horizontal closed position, whereby said doors collectively form the bottom of said vehicle;

a latching mechanism mounted beneath said center sill and connected to the torsion elements for rotating the same relative to the edge portions of the door sections, thereby to shift said latching elements to a disengaged position with respect to the door sections to release said door sections, whereby the sections swing downwardly from said horizontal closed position to the perpendicular unloading position to discharge the lading from the vehicle;

each of said torsion elements thereby constituting the coaxial door pivot shaft and latch pivot shaft independently rotatable relative to the edge portion of the door which is pivoted thereon;

and door operating mechanism mounted beneath said center sill and connected to said door sections collectively, said door operating mechanism adapted to shift said door sections from said perpendicular unloading position back to said horizontal closed position in engagement with said latching mechanism;

said center sill providing a cover over the latching and door operating mechanism to protect the same from the lading during unloading of the vehicle.

6. A hopper door mechanism for a vehicle adapted to transport bulk lading, said vehicle having a rigid center sill extending longitudinally of the vehicle, said vehicle having pairs of side walls and end walls, said hopper mechanism comprising:

a plurality of hopper door sections extending transversely from opposite sides of said center sill toward said side walls, said door sections normally being disposed in a generally horizontal closed position forming the bottom of the vehicle;

a plurality of normally stationary torsion elements extending transversely across said side walls and center sill and mounted for rocking motion relative to the vehicle;

each of said door sections having an edge portion pivotally mounted upon one of said normally stationary torsion elements on opposite sides of said center sill, said door sections adapted to swing downwardly to a generally perpendicular unloading position about said stationary torsion element;

a series of latch elements non-rotatably secured to said respective torsion elements and engageable with said door sections on opposite sides of the center sill and adapted to latch said door sections in said horizontal closed position;

a series of latch actuating levers mounted beneath the center sill and non-rotatably secured to a respective torsion element;

a power unit connected in common to said latch actuating levers and adapted to rotate said torsion elements relative to the edge portion of the door sections which are pivoted thereon in a direction to unlatch the door sections, adapting the sections to swing downwardly about said torsion elements to said unloading position;

each of said torsion elements thereby constituting a coaxial door pivot shaft and latch pivot shaft independently rotatable relative to the pivoted edge portion of the door section; and door operating mechanism connected to said door sections collectively, said door operating mechanism adapted to shift said door sections from said perpendicular unloading position back to said horizontal closed position and into engagement with said latching elements.

7. A hopper door mechanism for a vehicle adapted to transport bulk lading, said vehicle having a rigid center sill extending longitudinally of the vehicle, said vehicle having pairs of side walls and end walls, said hopper mechanism comprising:

a plurality of hopper door sections extending transversely from opposite sides of said center sill toward said side walls, said door sections normally being disposed in a generally horizontal closed position forming the bottom of the vehicle;

a plurality of normally stationary torsion elements extending transversely across said side walls and center sill and mounted for rocking motion relative to the vehicle;

each of said door sections having an edge portion pivotally mounted upon one of said torsion elements on opposite sides of said center sill, said door sections adapted to swing downwardly to a generally perpendicular unloading position about said stationary torsion element;

a series of latch elements non-rotatably secured to said respective torsion elements and engageable with said door sections on opposite sides of the center sill and adapted to latch said door sections in said horizontal closed position;

a series of latch actuating levers, each latch actuating lever being disposed beneath said center sill and non-rotatably secured to a respective torsion element for imparting rocking motion thereto;

a series of parallel links pivotally connecting the free end portions of said latch actuating levers to one another for rocking motion in unison;

a power unit connected to said parallel links and adapted to actuate the same in unison, thereby to rotate said torsion elements relative to the door sections which are pivoted thereon in a direction to unlatch the door sections;

each of said torsion elements thereby constituting a coaxial door pivot shaft and latch pivot shaft independently rotatable relative to the edge portion of the door section which is pivoted thereon;

means biasing said latch actuating levers in a latching direction; and door operating mechanism mounted beneath said center sill and connected to said door sections collectively, said door operating mechanism adapted to shift said door sections from said perpendicular unloading position back to said horizontal closed position and into engagement with said latching elemnts.

8. A hopper door mechanism for a vehicle adapted to transport bulk lading, said vehicle having a rigid center sill extending longitudinally of the vehicle, said vehicle having pairs of side walls and end walls, said hopper door mechanism comprising:

a plurality of hopper door sections extending transversely from opposite sides of said center sill towards the side walls, said door sections normally being disposed in a generally horizontal closed position forming the bottom of the vehicle;

a plurality of normally stationary torsion elements extending transversely across said center sill and to said side walls;

each of said door sections having an edge portion pivotally mounted upon one of said torsion elements on opposite sides of said center sill, each of said door sections adapted to swing downwardly to a generally perpendicular unloading position about the stationary torsion element to which it is pivotally connected;

a latching mechanism mounted upon said vehicle and adapted to engage and latch said door sections collectively in said closed horizontal position and to release said door sections, whereby the sections swing downwardly to said unloading position about the torsion element to which it is pivotally connected;

each of said torsion elements thereby constituting a coaxial door pivot shaft and latch pivot shaft independently rotatable relative to the edge portion of the door which is pivoted thereon;

a respective door-operating lever arm projecting downwardly from each of said door sections;

and power means connected in common to said door operating lever arms;

said power means being adapted to shift said lever arms in a direction to swing said door sections to said perpendicular open position when the door sections are unlatched by the latching mechanism.

9. A hopper door mechanism for a vehicle adapted to transport bulk lading, said vehicle having a rigid center sill extending longitudinally of the vehicle, said vehicle having pairs of side walls and end walls, said hopper door mechanism comprising:

a plurality of hopper door sections extending transversely from opposite sides of said center sill towards the side walls, said door sections normally being disposed in a generally horizontal closed position forming the bottom of the vehicle;

a plurality of normally stationary torsion elements extending transversely across said center sill and to said side walls, said torsion elements being mounted for rocking motion relative to the vehicle;

each of said door sections having an edge portion pivotally connected to one of said torsion elements on opposite sides of said center sill, said door sections adapted to swing downwardly to a generally perpendicular unloading position about the stationary torsion elements to which the edge portion of the door is pivotally connected;

a latching mechanism mounted upon said vehicle, said latching mechanism in driving connection with the torsion elements for rocking the normally stationary torsion elements, said normally stationary torsion elements latching said door sections collectively in said closed horizontal position and releasing said door sections when said rocking motion is imparted thereto relative to the door sections, whereby the sections swing downwardly about said torsion elements to said unloading position;

each of said torsion elements thereby constituting a coaxial door pivot shaft and latch pivot shaft independently rotatable relative to the edge portion of the door section which is pivoted thereon;

a respective door operating lever arm projecting downwardly from each of said door sections;

a series of parallel links pivotally connecting the free portions of said lever arms to one another for shifting the lever arms in unison;

spring means connected to said lever arms, normally biasing said door sections in door closing direction; and power means connected to the parallel links of said lever arms;

said power means adapted to shift said links and lever arms in a direction to swing said door sections to said perpendicular open position when the door sections are unlatched by the latching mechanism;

said spring biasing means adapted to shift said door sections back to said closed horizontal position and into engagement with the latching mechanism when said door operating power unit is de-energized.

References Cited

UNITED STATES PATENTS

| | | | |
|---|---|---|---|
| 1,107,896 | 8/1914 | Caswell | 105—296 XR |
| 1,268,118 | 6/1918 | Hillman | 105—288 XR |
| 1,631,313 | 6/1927 | Field | 105—364 |
| 2,012,114 | 8/1935 | Willoughby | 105—253 |
| 2,080,943 | 5/1937 | Jones | 105—253 XR |
| 2,478,608 | 8/1949 | Tillman | 105—244 |
| 2,612,119 | 9/1952 | Boyd | 105—253 |
| 2,640,441 | 6/1953 | Jones | 105 364 |
| 3,166,024 | 1/1965 | Hamilton | 105—240 |
| 3,315,616 | 4/1967 | Beaver et al. | 105—311 XR |
| 3,316,859 | 5/1967 | Floehr | 105—253 |

ARTHUR L. LA POINT, *Primary Examiner.*

H. BELTRAN, *Assistant Examiner.*